(12) United States Patent
Palmert et al.

(10) Patent No.: US 11,017,041 B2
(45) Date of Patent: May 25, 2021

(54) SYSTEMS, METHODS, AND APPARATUSES FOR COLLABORATIVE FILTERING IN A CLOUD BASED COMPUTING ENVIRONMENT

(71) Applicant: salesforce.com, inc., San Francisco, CA (US)

(72) Inventors: Joel Ragnar Palmert, Stockholm (SE); Zhenhua Xu, Stockholm (SE)

(73) Assignee: salesforce.com, inc., San Francisco, CA (US)

( * ) Notice: Subject to any disclaimer, the term of this patent is extended or adjusted under 35 U.S.C. 154(b) by 503 days.

(21) Appl. No.: 15/885,641

(22) Filed: Jan. 31, 2018

(65) Prior Publication Data
US 2019/0236213 A1 Aug. 1, 2019

(51) Int. Cl.
*G06F 16/9535* (2019.01)
*G06Q 30/06* (2012.01)
*G06F 16/2457* (2019.01)
*G06F 16/9536* (2019.01)

(52) U.S. Cl.
CPC .... *G06F 16/9535* (2019.01); *G06F 16/24578* (2019.01); *G06F 16/9536* (2019.01); *G06Q 30/0631* (2013.01)

(58) Field of Classification Search
CPC ........... G06F 16/24578; G06F 16/9535; G06F 16/9536; G06Q 30/0631
See application file for complete search history.

(56) References Cited

U.S. PATENT DOCUMENTS

| | | | | |
|---|---|---|---|---|
| 9,256,761 | B1* | 2/2016 | Sahu | G06F 16/90335 |
| 2001/0028603 | A1* | 10/2001 | Shimazu | G06F 16/242 |
| | | | | 368/10 |
| 2008/0294617 | A1* | 11/2008 | Chakrabarti | G06F 16/9535 |
| 2009/0171755 | A1* | 7/2009 | Kane | G06Q 30/0214 |
| | | | | 705/14.16 |
| 2013/0013749 | A1* | 1/2013 | Kane, Jr. | G06Q 30/0253 |
| | | | | 709/219 |

(Continued)

*Primary Examiner* — Richard L Bowen
(74) *Attorney, Agent, or Firm* — Elliot, Ostrander & Preston, P.C.

(57) ABSTRACT

An application server platform operated by a cloud computing services provider receives input from a customer organization application executing on the application server platform, the input specifying a first action on a first item type, and a second action on a second item type to recommend in response to the specified first action on the first item type. The application server platform searches for a record in a permanent data store that contains the first action, the first item type, the second action, and the second item type, and assigns a value to a token associated with the record based on when the application server platform most recently generated a recommendation that included the first action on the first item type and the second action on the second item type from the record, when the search locates the record in the permanent data store. One embodiment further comprises generating a current recommendation that includes the first action on the first item type and the second action on the second item type from the located record, based on the assigned value of the token associated with the located record.

21 Claims, 7 Drawing Sheets

(56) References Cited

U.S. PATENT DOCUMENTS

| | | | |
|---|---|---|---|
| 2014/0222622 A1* | 8/2014 | Du | G06F 16/9535 |
| | | | 705/26.63 |
| 2016/0140447 A1* | 5/2016 | Cohen | G06N 5/048 |
| | | | 706/52 |
| 2017/0366685 A1* | 12/2017 | Hirooka | H04N 1/00183 |
| 2018/0025084 A1* | 1/2018 | Conlan | G06F 16/955 |
| | | | 707/734 |

* cited by examiner

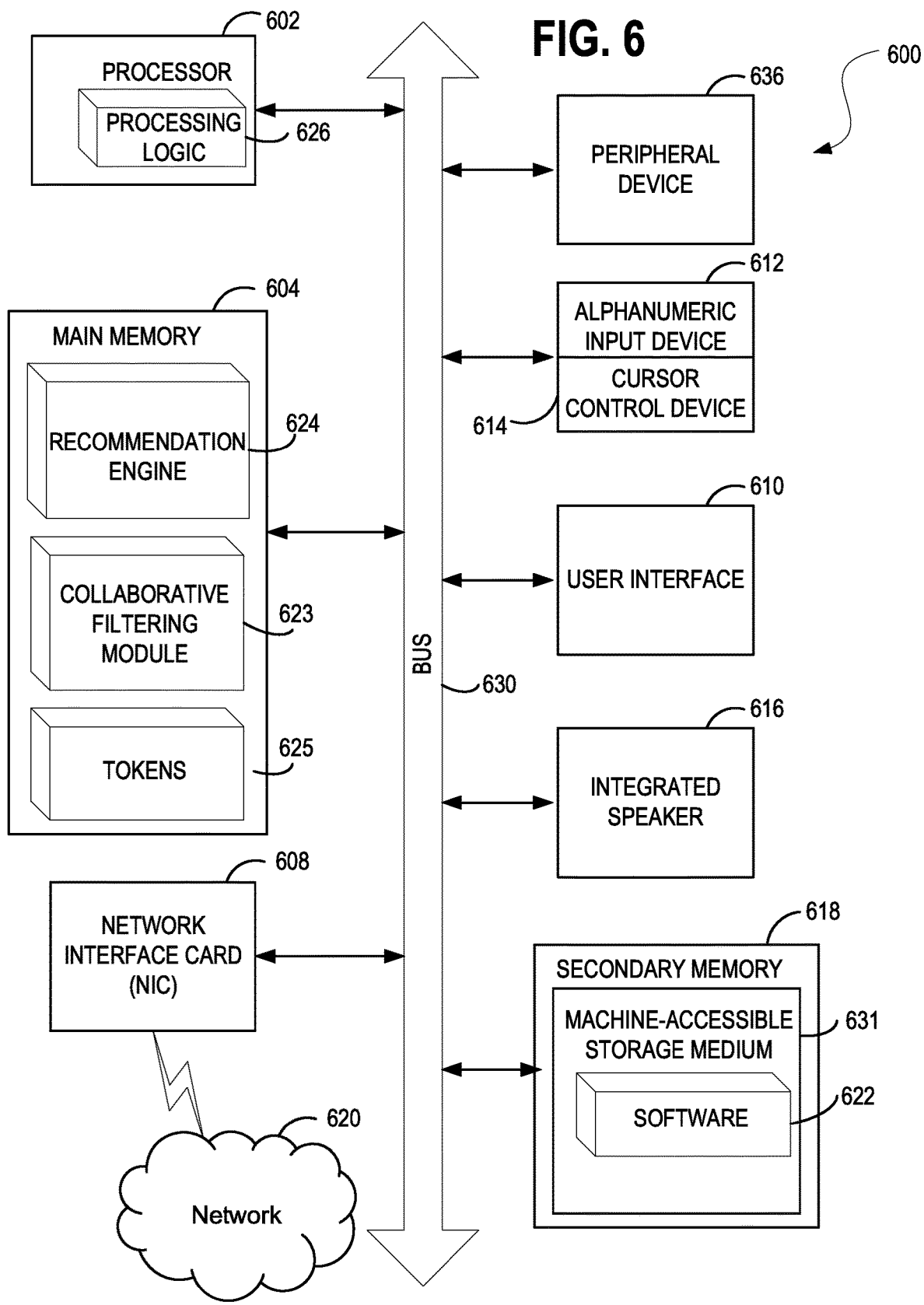

SYSTEMS, METHODS, AND APPARATUSES FOR COLLABORATIVE FILTERING IN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of collaborative filtering, and more particularly, to systems, methods, and apparatuses for implementing collaborative filtering in a cloud based computing environment. Such embodiments may be implemented within the computing architecture of a hosted computing environment, such as an on-demand or cloud-computing environment that utilizes multi-tenant database technologies, client-server technologies, traditional database technologies, or other computing architecture(s) in support of the hosted computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

Item-to-Item Collaborative filtering (CF) is an algorithm for predicting user behavior. It relates all pairs of items in a system by how many times the two items have been acted on in some manner by the same user. For example, when a user performs an action on a first item, the algorithm can predict that the user will also perform the same or a different action on a second item if many users in the past have performed both the action on the first item and the same or different action on the second item. As noted above, the two actions are often the same action but do not have to be. Furthermore, the two items are often of the same type but do not have to be. In one such example, users are buying books. Two books are considered related if a user has purchased both books. The more users that buy the pair, the more related the books are considered to be. If yet another user then buys one of the books, the algorithm can predict that this other user likely will buy the second book as well, and provide a recommendation of such to the user.

Item-to-item collaborative filtering works well when a single organization maintains the database of items and maintains the software that controls the actions that can be performed on items in the database. In a cloud computing services environment, when multiple organizations' are hosted by a cloud computing services provider, the provider may support hundreds, perhaps thousands of customer organizations, each with any number of items or events and any number of types of actions that can be performed on or with each item. The number of possible item-to-item collaborations to track and recommend in such an environment may become quite significant, if not impossible, to manage.

The present state of the art may therefore benefit from the systems, methods, and apparatuses for collaborative filtering in a cloud based computing environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6 illustrates a diagrammatic representation of a machine in the exemplary form of a computer system, in accordance with one embodiment.

DETAILED DESCRIPTION

Figure 1:
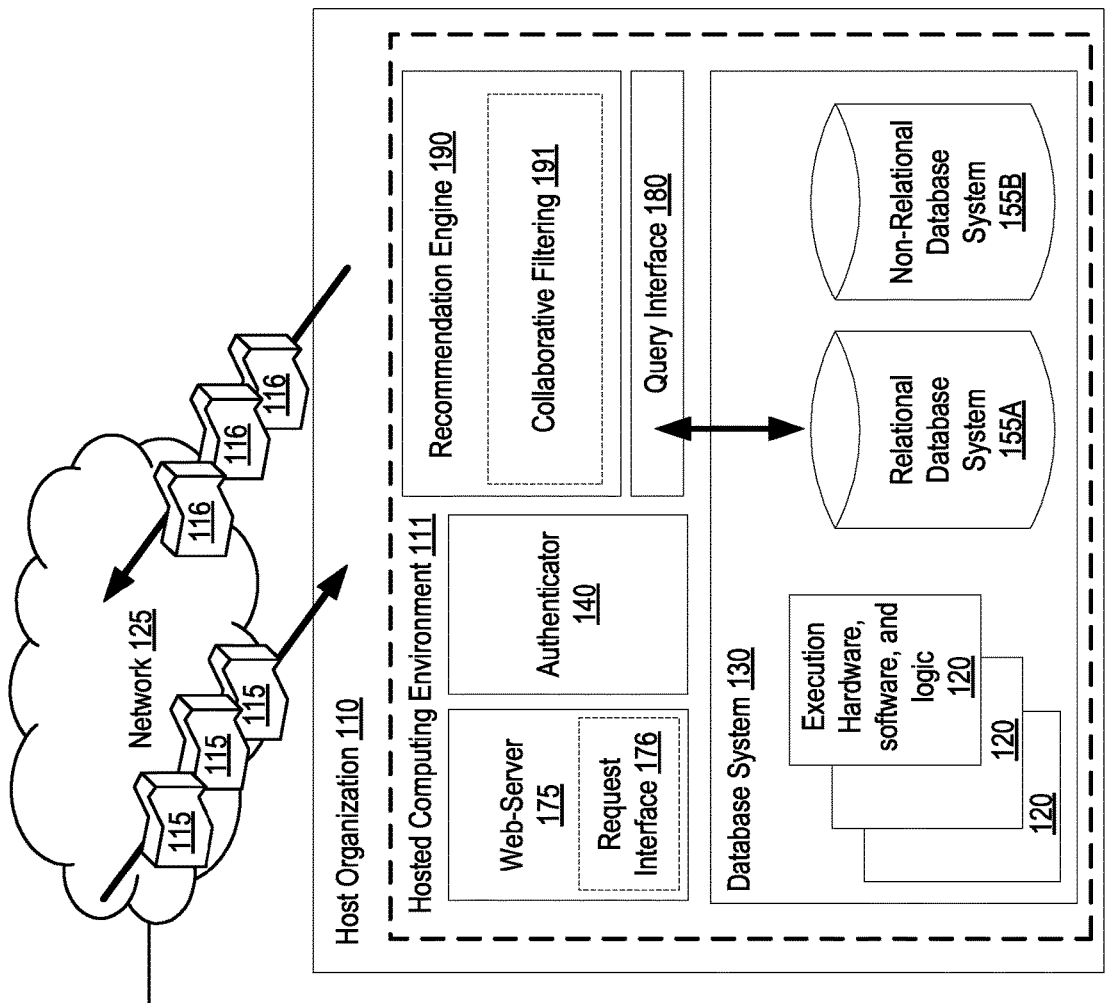
FIG. 1 depicts an exemplary architecture in accordance with described embodiments.
Figure 1:
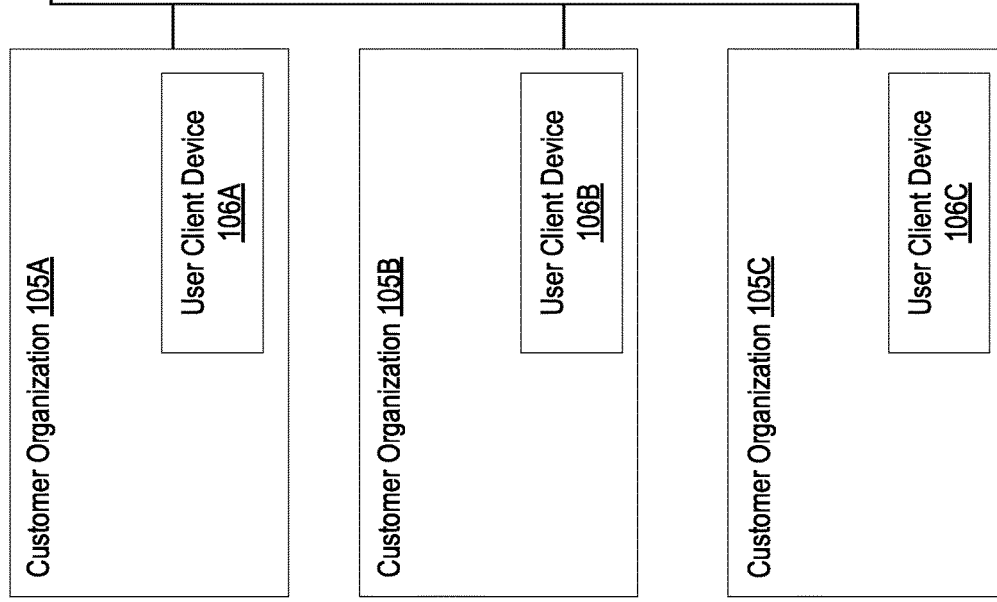

Described herein are systems, methods, and apparatuses for collaborative filtering in a cloud based computing environment. For instance, an application server platform operated by a cloud computing services provider receives input from a customer organization application executing on the application server platform, the input specifying a first action on a first item type, and a second action on a second item type to recommend in response to the specified first action on the first item type. The application server platform searches for a record in a permanent data store that contains the first action, the first item type, the second action, and the second item type, and assigns a value to a token associated with the record based on when the application server platform most recently generated a recommendation that included the first action on the first item type and the second action on the second item type from the record, when the search locates the record in the permanent data store. One embodiment further comprises generating a current recommendation that includes the first action on the first item type and the second action on the second item type from the located record, based on the assigned value of the token associated with the located record.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Host organization 110 further includes a recommendation system 190. A recommendation system typically produces a list of recommendations in one of two ways—through collaborative filtering or through content-based filtering. Collaborative filtering approaches build a model, matrix, or list of recommendations from a user's (or users') past behavior(s). This model is then used to predict items (or ratings for items) that the user may have an interest in. Recommendation system 190 further comprises or communicates with a collaborative filtering function module 191. Generally speaking, item-item collaborative filtering, or item-based collaborative filtering, or item-to-item collaborative filtering, is a form of collaborative filtering for recommendation systems based on the similarity between items and/or actions performed on the items. Collaborative filtering has two stages. Most collaborative filtering systems, in the first stage, execute a model- or list-building stage by finding a similarity or relationship between all pairs of actions or events and/or items or objects. In the second stage, the system generates a recommendation or a list of recommendations. It uses the most similar items to a user's (or users') already-rated or already-acted upon items to generate the recommendation or the list of recommendations. In one embodiment, the recommendation engine provides the collaborative filtering with recommendations that the collaborative filtering function can use in supporting customer organization applications that in turn provide recommendations to user client devices.

Figure 2:
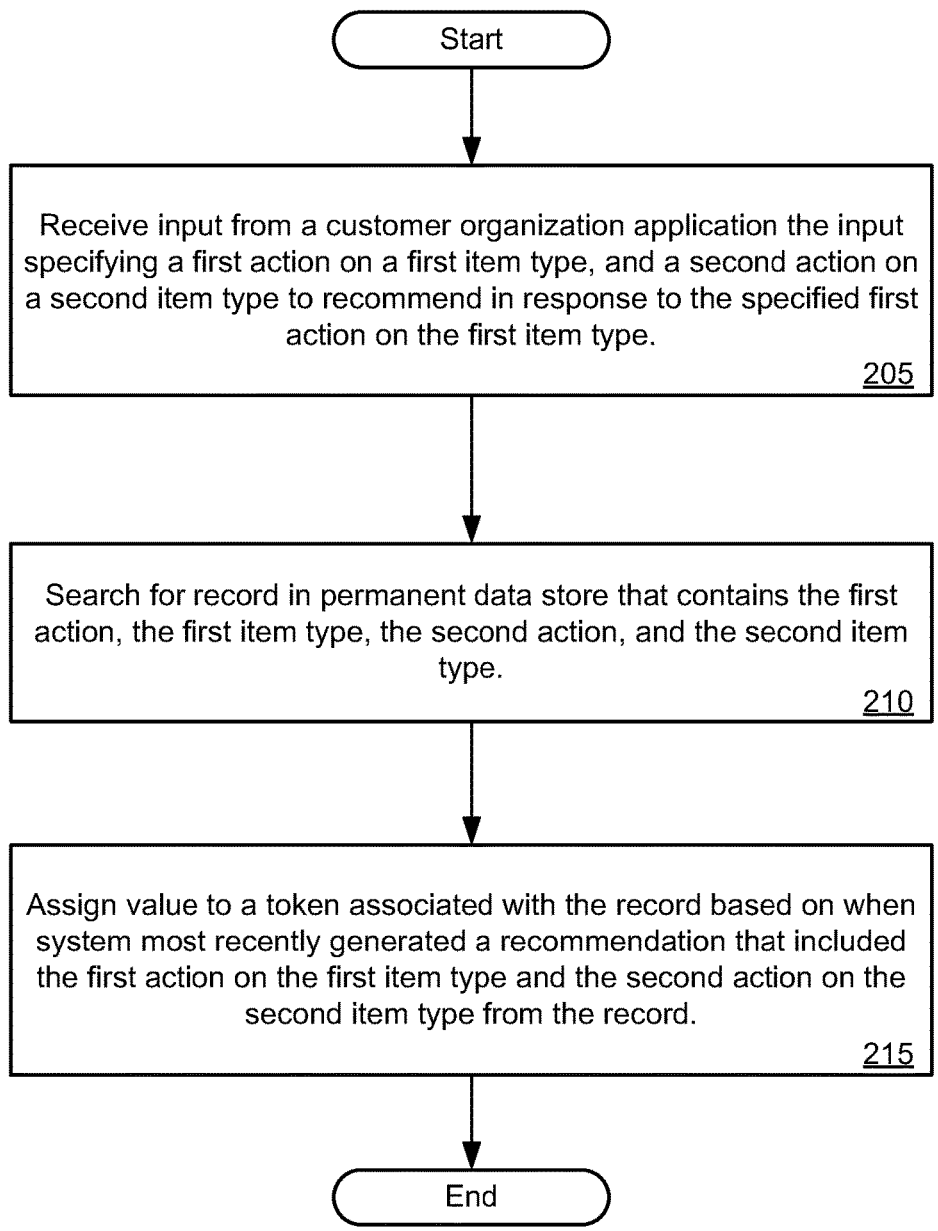
FIG. 2 illustrates a flow diagram in accordance with an embodiment of the invention.
Figure 3:
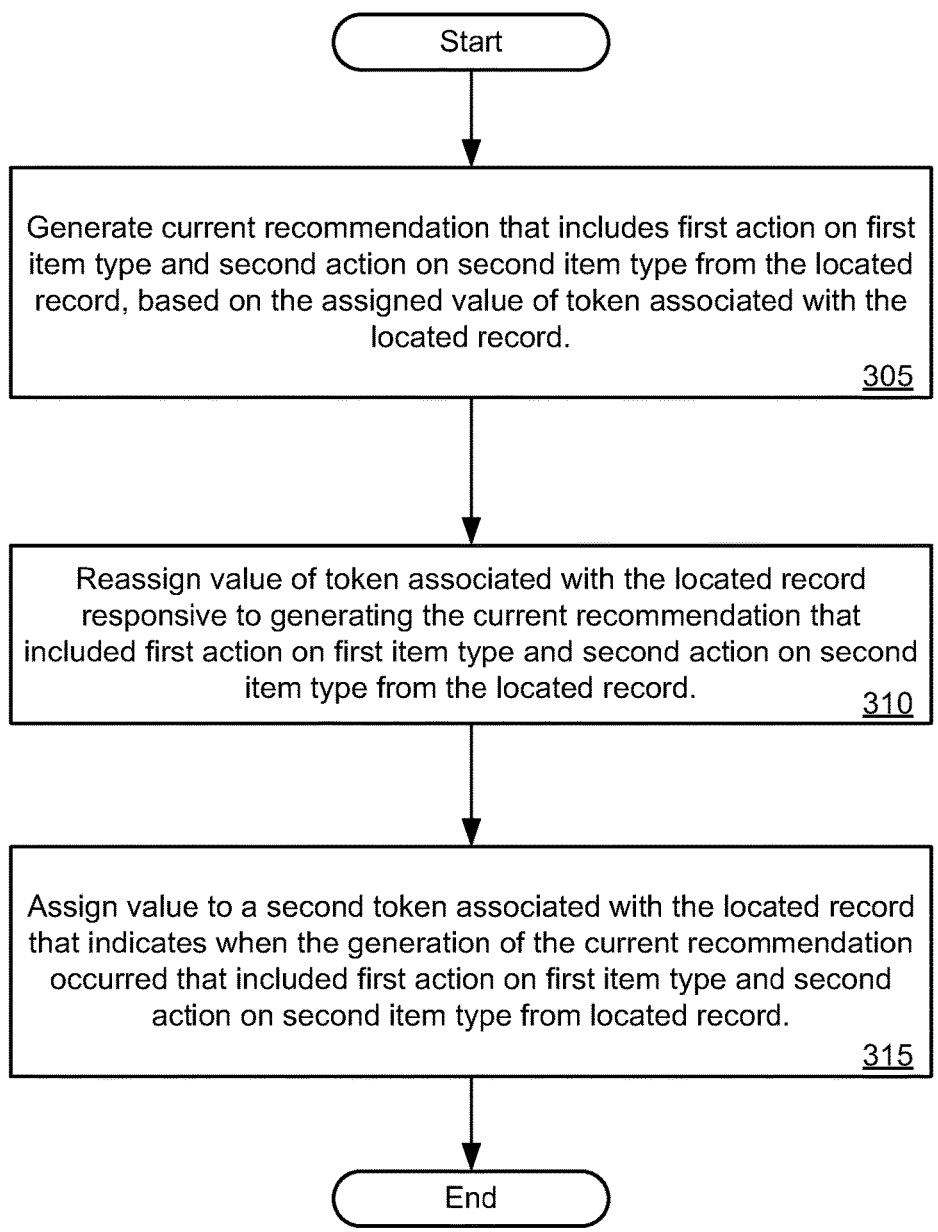
FIG. 3 illustrates a flow diagram in accordance with an embodiment of the invention.
Figure 4:
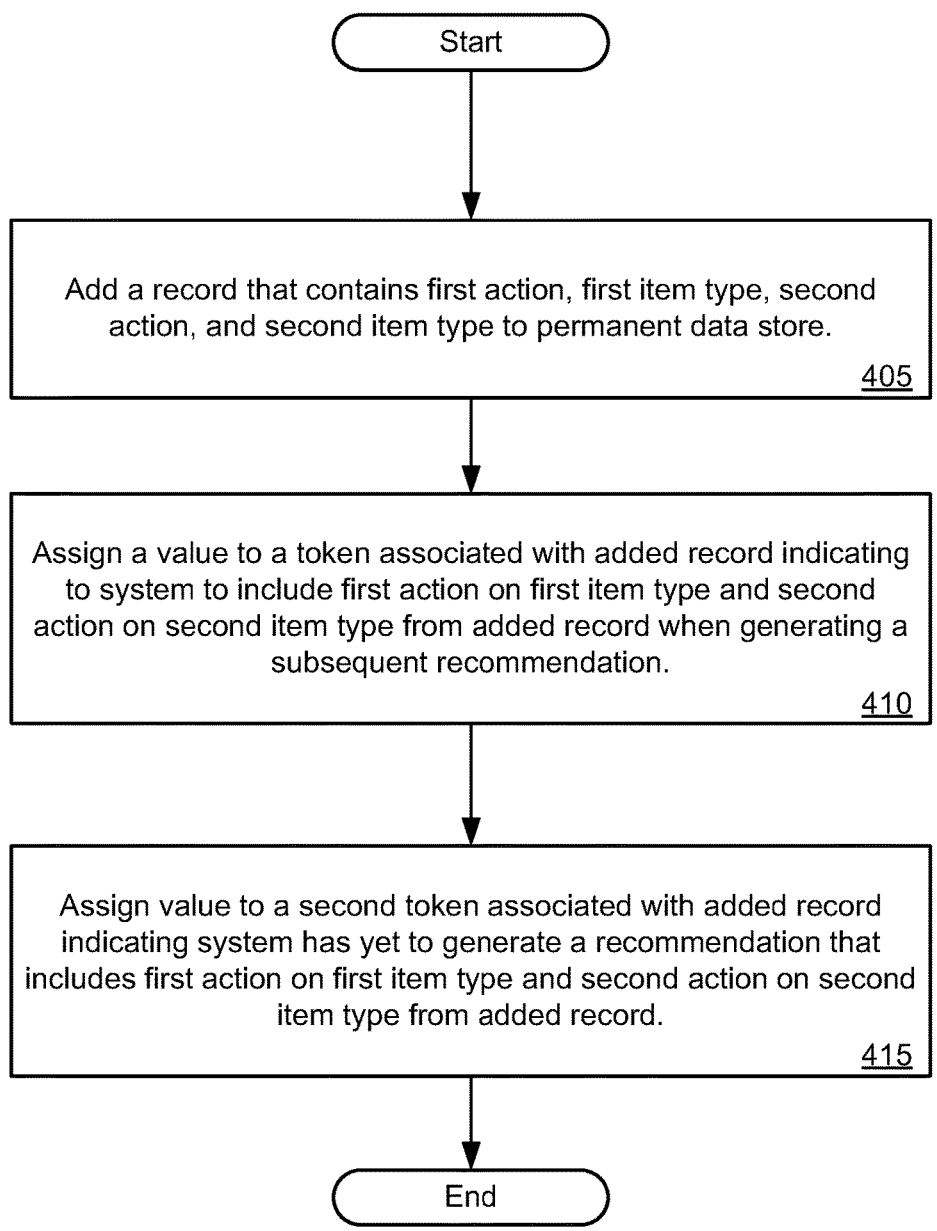
FIG. 4 illustrates a flow diagram in accordance with an embodiment of the invention.

FIGS. 2-4 depict flow diagrams illustrating methods for collaborative filtering according to embodiments of the invention. The described methods may be performed by processing logic that may include hardware (e.g., circuitry, dedicated logic, programmable logic, microcode, etc.), and software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, its database system 130 as depicted at FIG. 1, and other systems and components as described herein may implement the described methodologies. Some of the logic blocks and/or operations listed below are optional in accordance with certain embodiments. The numbering of the logic blocks presented is for the sake of clarity and is not intended to prescribe an order of operations in which the various logic blocks must occur.

The embodiment generally described above is further depicted in flow diagram 200 of FIG. 2, wherein at logic block 205, processing logic, for example, recommendation engine 190 executing on an application server platform operated by a cloud computing services provider, receives input. The input may be received, for example, from a customer organization application being hosted by, that is, executing on, the application server platform, either directly from the customer organization application, or by way of collaborative filtering function module 191 in communication with the customer organization application. The input specifies a first action on a first item type taken by a user at a user client device in communication with a customer organization application, and a second action on a second item type for the customer organization application to recommend, in the sense of item-to-item collaborative filtering, in response to the specified first action on the first item type.

Examples of actions or events might be "view", "follow", or "join", whereas the items or objects to which the actions are applied might include "users", "groups", or "files". Of course, the examples provided herein are not exhaustive—there could be many different customer organizations using cloud-computing services, and each organization's application(s) might support many actions and many items or objects, many of which may be customized. So there may be many possible permutations of collaborative filtering recommendations, some of which make sense, some of which do not, and all of which the cloud computing services provider or application server platform executing in the cloud computing environment does not know about beforehand or control. For example, the tuple "first action: follow—first item type: user; second action: follow—second item type: user" is a useful tuple to track and recommend to a customer organization application. However, the tuple "first action: follow—first item type: user; second action: view—second item type: file" is likely not useful. One objective of the embodiments described herein is to limit the number of tuples being managed by the recommendation engine to those that are useful and recommend to the collaborative filtering function those tuples that are needed by the customer organization application(s) hosted by the cloud computing services platform.

In one embodiment, the input specifying the first action on the first item type is received from a user client device selecting the first action on the first item type, for example, on a web page loaded by the customer organization application. In one embodiment, the input specifying the second action on the second item type to recommend in response to the specified first action on the first item type is provided by the customer organization application, recommending to the user client device the second action on the second item type in response to receiving the input from the user client device specifying the first action on the first item.

Returning to the flow diagram of FIG. 2, processing logic 210 searches a permanent data store accessible to the application server platform, e.g., database system 130 or a multi-tenant database type database system, for a record that contains the first action, the first item type, as well as the second action, and the second item type, to recommend in response to the first action and first item type.

At logic block 215, if the record is found in the database, the system assigns a value to a token associated with the record based on when the application server platform last, or most recently, generated a list of recommendations that included the first action on the first item type and the second action on the second item type from the record to recommend in response to the first action on first item type. In one embodiment, the token is stored in the record along with the first action on the first item type and the second action on the second item type.

One implementation for assigning the value to the token associated with the record comprises establishing and incrementing a count, or counter, associated with the record based on when the application server platform most recently generated the recommendation. In one such embodiment, the count is based on the number of days that have elapsed since the application server platform most recently generated the recommendation that included the first action on the first item type and the second action on the second item type from the record. In another such embodiment, the count is based on a square of the number of days that have elapsed since the application server platform most recently generated the recommendation that included the first action on the first item type and the second action on the second item type from the record. In this manner, the token, e.g., counter, conveys how "stale" this recommendation information is. For example, the larger the value of the counter, the more "stale" the recommendation information. As described further below, this measure of the age of the recommendation information is useful in deciding which recommendations the recommendation engine is to generate and send to the collaborative filtering function. In another embodiment, the token could be set to a value that represents an "old" or "stale" recommendation, or set to a different value that represents a more recent recommendation, or even set to a value that indicates the recommendation engine has not yet generated a recommendation including the first action on the first item type and the second action on the second item type to recommend in response to the first action on first item type.

With reference to the flow diagram 300 depicted in FIG. 3, the recommendation engine, at logic block 305, generates recommendations, for example, on a reoccurring basis, such as nightly, that it provides to the collaborative filtering function, so that the collaborative filtering function can support customer organization applications that, in turn, provide collaborative filtering recommendations to user client devices. For example, when a user at a user client device communicates with the customer organization application via a user interface and loads a web page for the application to perform some action on an item of a particular type, the customer organization application may initiate a request to the collaborative filtering function to provide another action on another type of item to recommend to the user, for example, by displaying such on the display screen of the user client device.

One objective for the recommendation engine generating, or regenerating, a list of recommendations, according to one embodiment of the invention, is to include tuples from the database based on the assigned value of the token associated with each tuple. Thus, not all tuples are included in the generated recommendation. What is helpful is to include records in recommendations that have not been included in previous recommendations, or that have not been included in previous recommendations for some significant period of time (relative to other records that have been included in more recent previous recommendations). Recall that when the record was found at logic block 215, the system assigned a value to the token associated with the record based on when the application server platform last generated a recommendation that included the first action on the first item type and the second action on the second item type from that record. In one embodiment, if the value of the token suggests the record has not been included in previous recommendations, or that the record has not been included in previous recommendations for some significant period of time, the contents of the record will be included in the generated recommendation. In one embodiment, wherein the token comprises a count associated with the record, and wherein generating the current recommendation that includes the first action on the first item type and the second action on the second item type from the located record is based on the assigned value of the token associated with the located record, the recommendation engine generates the current recommendation including the first action on the first item type and the second action on the second item type from the located record when the assigned value of the count associated with the located record is greater than zero or exceeds some threshold value. The threshold value ensures those records that haven't been included in the recommendation before, or for some time, are included before recently included records are included.

At logic block 310, once a list of recommendations has been generated, including the tuple information from the located record, the system reassigns the value of the token associated with the located record responsive to generating the recommendation. For example, if the token is a counter, one embodiment sets the counter to zero, to indicate the contents of the located record were included in the currently generated recommendation and thus, do not, or it is low priority to, include this same information in a subsequently generated recommendation.

At logic block 315, the system further assigns a value to a second token associated with the located record that indicates when the generation of the current recommendation occurred that included the first action on the first item type and the second action on the second item type from the located record. In one embodiment, the second token is assigned the date of the generation of the current, or last, recommendation that included the located record.

Referring back to logic block 210 in FIG. 2, and further with reference to the flow diagram 400 depicted in FIG. 4, when the search for the record in the database fails to locate the record, i.e., the record is missing because the tuple has never been received before from the customer organization application, logic block 405 in one embodiment adds a record to the database that includes the first action, the first item type, and the second action, and the second item type to recommend in response to the first action, first item type. For this new record, logic block 410 assigns a value to a token associated with the added record indicating to the application server platform, e.g., the recommendation engine, to include this first action on the first item type, and the second action on the second item type to recommend in response to the first action on the first item type, when generating a subsequent recommendation. In one embodiment, the token is set to a large or even maximum value to indicate high priority in including this new record in the next recommendation that is generated. In one embodiment, the token is a counter that indicates the number of days or the square of the number of days since the last recommendation was generated that included the contents of this record. By setting this counter to a large value, it suggests to the recommendation engine a high priority to include this information in a subsequent, e.g., next, generated recommendation.

According to one embodiment, logic block 410 sets the token to a nil or zero value, and logic block 415 further assigns a value to a second token associated with the newly added record indicating the application server platform has yet to generate a recommendation that includes the first action on the first item type, and the second action on the second item type to recommend in response to the first action on the first item type from the added record. In one embodiment, this token may represent a "last generation date", and may be set to a default, or dummy, value that represents the earliest possible date recognized by the recommendation engine, which, when combined with the first token, suggests a high, higher, or highest priority in including this new record in the next or subsequently generated list of recommendations.

In embodiments of the invention, a customer organization associated with the customer organization application is a tenant of a multi-tenant database system accessible to the application server platform. In such an embodiment, when searching for a record in the database accessible to the application server platform that contains the first action, the first item type, the second action, and the second item type to recommend in response to the first action and first item type, the system searches for a record in a multi-tenant database that additionally contains or is associated with a customer organization application identifier for the customer organization. Doing so allows the recommendation engine to make recommendations on a per tenant basis.

Figure 5A:
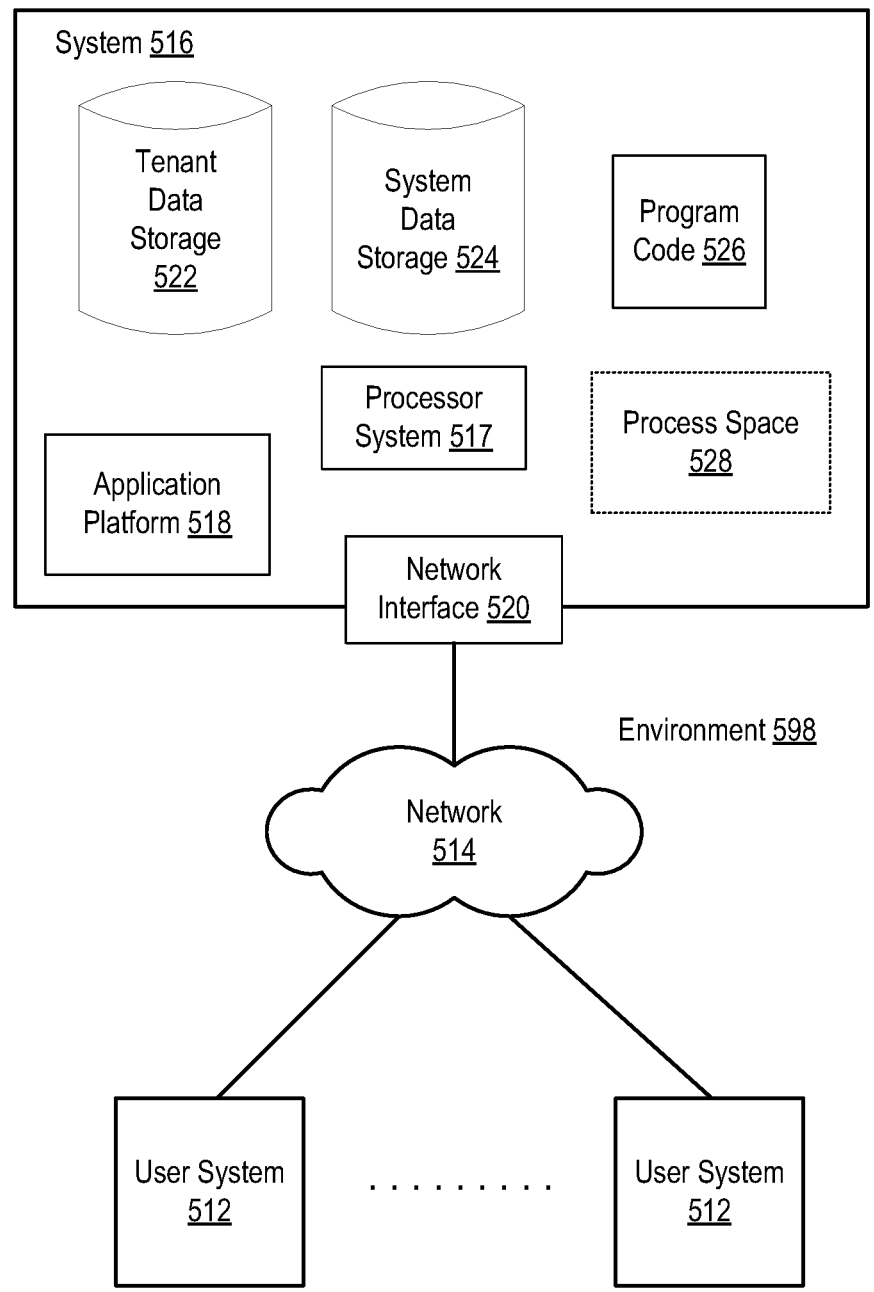
FIG. 5A illustrates a block diagram of an environment in which an on-demand database service may operate in accordance with the described embodiments.

FIG. 5A illustrates a block diagram of an environment 598 in which an on-demand database service may operate in accordance with the described embodiments. Environment 598 may include user systems 512, network 514, system 516, processor system 517, application platform 518, network interface 520, tenant data storage 522, system data storage 524, program code 526, and process space 528. In other embodiments, environment 598 may not have all of the components listed and/or may have other elements instead of, or in addition to, those listed above.

Environment 598 is an environment in which an on-demand database service exists. User system 512 may be any machine or system that is used by a user to access a database system. For example, any of user systems 512 can be a handheld computing device, a mobile phone, a laptop computer, a work station, and/or a network of computing devices. As illustrated in FIG. 5A (and in more detail in FIG. 5B) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" is used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5A, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5A, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5A include conventional, well-known elements that are explained only briefly here. For example, each user system 512 may include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5B:
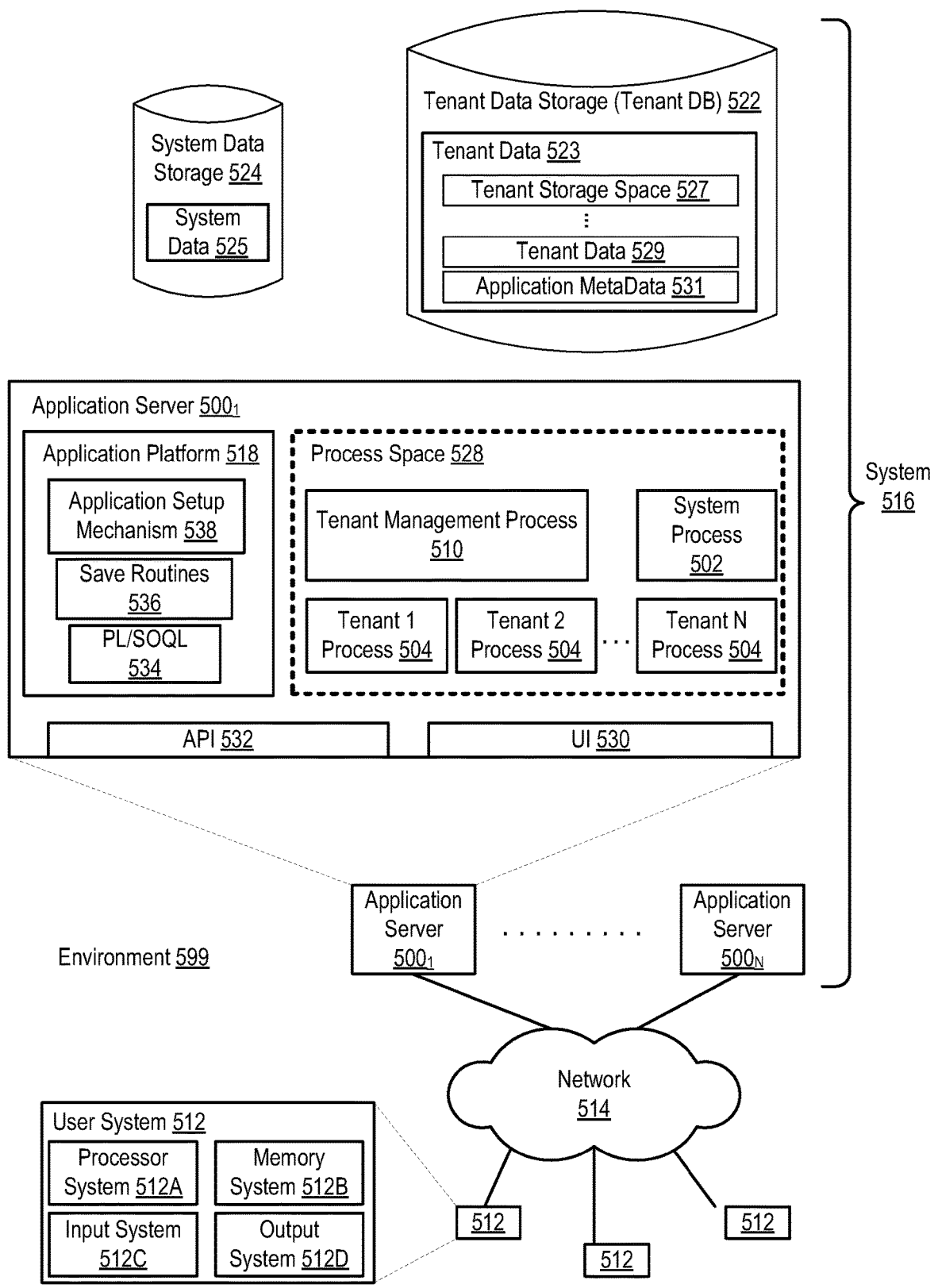
FIG. 5B illustrates another block diagram of an embodiment of elements of FIG. 5A and various possible interconnections between such elements in accordance with the described embodiments.

FIG. 5B illustrates another block diagram of an embodiment of elements of FIG. 5A and various possible interconnections between such elements in accordance with the described embodiments. FIG. 5B also illustrates environment 599. However, in FIG. 5B, the elements of system 516 and various interconnections in an embodiment are illustrated in further detail. More particularly, FIG. 5B shows that user system 512 may include a processor system 512A, memory system 512B, input system 512C, and output system 512D. FIG. 5B shows network 514 and system 516. FIG. 5B also shows that system 516 may include tenant data storage 522, having therein tenant data 523, which includes, for example, tenant storage space 527, tenant data 529, and application metadata 531. System data storage 524 is depicted as having therein system data 525. Further depicted within the expanded detail of application servers $500_{1-N}$ are User Interface (UI) 530, Application Program Interface (API) 532, application platform 518 including PL/SOQL 534, save routines 536, and application setup mechanism 538, process space 528 including system process space 502, tenant 1-N process spaces 504, and tenant management process space 510. In other embodiments, environment 599 may not have the same elements as those listed above and/or may have other elements instead of, or in addition to, those listed above.

User system 512, network 514, system 516, tenant data storage 522, and system data storage 524 were discussed above in FIG. 5A. As shown by FIG. 5B, system 516 may include a network interface 520 (of FIG. 5A) implemented as a set of HTTP application servers 500, an application platform 518, tenant data storage 522, and system data storage 524. Also shown is system process space 502, including individual tenant process spaces 504 and a tenant management process space 510. Each application server 500 may be configured to tenant data storage 522 and the tenant data 523 therein, and system data storage 524 and the system data 525 therein to serve requests of user systems 512. The tenant data 523 might be divided into individual tenant storage areas (e.g., tenant storage space 527), which can be either a physical arrangement and/or a logical arrangement of data. Within each tenant storage space 527, tenant data 529, and application metadata 531 might be similarly allocated for each user. For example, a copy of a user's most recently used (MRU) items might be stored to tenant data 529. Similarly, a copy of MRU items for an entire organization that is a tenant might be stored to tenant storage space 527. A UI 530 provides a user interface and an API 532 provides an application programmer interface into system 516 resident processes to users and/or developers at user systems 512. The tenant data and the system data may be stored in various databases, such as one or more Oracle™ databases.

Application platform 518 includes an application setup mechanism 538 that supports application developers' creation and management of applications, which may be saved as metadata into tenant data storage 522 by save routines 536 for execution by subscribers as one or more tenant process spaces 504 managed by tenant management process space 510 for example. Invocations to such applications may be coded using PL/SOQL 534 that provides a programming language style interface extension to API 532. Invocations to applications may be detected by one or more system processes, which manages retrieving application metadata 531 for the subscriber making the invocation and executing the metadata as an application in a virtual machine.

Each application server 500 may be communicably coupled to database systems, e.g., having access to system data 525 and tenant data 523, via a different network connection. For example, one application server $500_1$ might be coupled via the network 514 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 512 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user may hit three different application servers 500, and three requests from different users may hit the same application server 500. In this manner, system 516 is multi-tenant, in which system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 500 to request and update system-level and tenant-level data from system 516 that may require sending one or more queries to tenant data storage 522 and/or system data storage 524. System 516 (e.g., an application server 500 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a recommendation engine 624, and collaborative filtering module 623 that communicate with software 622 in accordance with the described embodiments. Tokens 625 may also be stored in main memory 604 in accordance with embodiments of the invention. Main memory 604 is operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method, performed by an application server platform (ASP) operated by a cloud computing services provider, comprising:

receiving from a customer organization application (COA) executing on the ASP input including a first action on a first item type, and a second action on a second item type to recommend in response to the first action on the first item type;

locating a record in a permanent data store accessible to the ASP that contains the first action, the first item type, the second action, and the second item type; and assigning a value to a token associated with the record based on when the ASP previously generated a recommendation including the first action on the first item type and the second action on the second item type to recommend in response to the first action on the first item type;

generating a new recommendation including the first action on the first item type and the second action on the second item type to recommend in response to the first action on the first item type, based on the value assigned to the token associated with the record; and transmitting the new recommendation to the COA.

2. The method of claim 1, wherein the value assigned to the token comprises a count associated with the record, and wherein generating the new recommendation that includes the first action on the first item type and the second action on the second item type to recommend in response to the first action on the first item type, based on the value assigned to the token associated with the record, comprises generating the new recommendation that includes the first action on the first item type and the second action on the second item type when the count associated with the record is greater than zero or exceeds a threshold value.

3. The method of claim 1, further comprising:
reassigning the value of the token associated with the record responsive to generating the new recommendation that includes the first action on the first item type and the second action on the second item type; and
assigning a value to a second token associated with the record that indicates when the generation occurred for the new recommendation that includes the first action on the first item type and the second action on the second item type.

4. The method of claim 1, further comprising:
adding a new record that contains the first action, the first item type, the second action, and the second item type to the permanent data store when failing to locate the record that contains the first action, the first item type, the second action, and the second item type in the permanent data store;
assigning a value to a token associated with the new record indicating to the ASP to include the first action on the first item type and the second action on the second item type to recommend in response to the first action on the first item type; and
assigning a value to a second token associated with the new record indicating the ASP has yet to generate a new recommendation that includes the first action on the first item type and the second action on the second item type to recommend in response to the first action on the first item type.

5. The method of claim 1, wherein a customer organization associated with the COA is a tenant of a multi-tenant database system accessible to the ASP; and
wherein locating the record in the permanent data store accessible to the ASP that contains the first action, the first item type, the second action, and the second item type, comprises locating a record in a multi-tenant database that additionally contains a COA identifier associated with the customer organization.

6. The method of claim 1, wherein receiving from the COA executing on the ASP input including the first action on the first item type, comprises receiving from the COA input from a user client device selecting the first action on the first item type; and
wherein receiving from the COA executing on the ASP input including the second action on the second item type to recommend in response to the first action on the first item type, comprises receiving input from the COA recommending to the user client device the second action on the second item type in response to receiving the input from the user client device selecting the first action on the first item type.

7. The method of claim 1, wherein assigning the value to the token associated with the record based on when the ASP previously generated the recommendation that included the first action on the first item type and the second action on the second item type to recommend in response to the first action on the first item type, comprises incrementing a count associated with the record based on when the ASP most recently generated the recommendation, wherein the count is based on one of: a number of days, and a square of the number of days, elapsed since the ASP most recently generated the recommendation that included the first action on the first item type and the second action on the second item type.

8. A system to execute within a host organization, wherein the system comprises:
a processor and a memory to execute instructions on the system, the instructions providing:
means for receiving from a customer organization application (COA) executing on the ASP input including a first action on a first item type, and a second action on a second item type to recommend in response to the first action on the first item type;
means for locating a record in a permanent data store accessible to the ASP that contains the first action, the first item type, the second action, and the second item type; and
means for assigning a value to a token associated with the record based on when the ASP previously generated a recommendation including the first action on the first item type and the second action on the second item type from the record to recommend in response to the first action on the first item type;
means for generating a new recommendation including the first action on the first item type and the second action on the second item type to recommend in response to the first action on the first item type, based on the value assigned to the token associated with the record; and
means for transmitting the new recommendation to the COA.

9. The system of claim 8, wherein the value assigned to the token comprises a count associated with the record, and wherein the means for generating the new recommendation that includes the first action on the first item type and the second action on the second item type from the located record to recommend in response to the first action on the first item type, based on the value assigned to the token associated with the record, comprises the means for generating the new recommendation that includes the first action on the first item type and the second action on the second item type when the count associated with the record is greater than zero or exceeds a threshold value.

10. The system of claim 8, further comprising:
means for reassigning the value of the token associated with the record responsive to generating the new recommendation that includes the first action on the first item type and the second action on the second item type; and
means for assigning a value to a second token associated with the record that indicates when the generation occurred for the new recommendation that includes the first action on the first item type and the second action on the second item type.

11. The system of claim 8, further comprising:
means for adding a new record that contains the first action, the first item type, the second action, and the second item type to the permanent data store when failing to locate the record that contains the first action, the first item type, the second action, and the second action type in the permanent data store;
means for assigning a value to a token associated with the new record indicating to the ASP to include the first action on the first item type and the second action on the second item type to recommend in response to the first action on the first action type; and means for assigning a value to a second token associated with the new record indicating the ASP has yet to generate a new recommendation that includes the first action on the first item type and the second action on the second item type to recommend in response to the first action on the first action type.

12. The system of claim 8, wherein a customer organization associated with the COA is a tenant of a multi-tenant database system accessible to the ASP; and wherein the means for locating the record in the permanent data store accessible to the ASP, that contains the first action, the first item type, the second action, and the second item type, comprises means for locating a record in a multi-tenant database that additionally contains a COA identifier associated with the customer organization.

13. The system of claim 8, wherein the means for receiving from the COA executing on the ASP input including the first action on a first item type, comprises means for receiving from the COA input from a user client device selecting the first action on the first item type; and wherein the means for receiving from the COA executing on the ASP input including the second action on the second item type to recommend in response to the first action on the first item type, comprises means for receiving input from the COA recommending to the user client device the second action on the second item type in response to receiving the input from the user client device selecting the first action on the first item type.

14. The system of claim 8, wherein the means for assigning the value to the token associated with the record based on when the ASP previously generated the recommendation that included the first action on the first item type and the second action on the second item type to recommend in response to the first action on the first item type, comprises means for incrementing a count associated with the record based on when the ASP most recently generated the recommendation, wherein the count is based on one of: a number of days, and a square of the number of days, elapsed since the ASP most recently generated the recommendation that included the first action on the first item type and the second action on the second item type.

15. Non-transitory computer readable storage media having instructions stored thereon that, when executed by a processor of an application server platform (ASP), the instructions cause the ASP to perform the following operations:

receiving from a customer organization application (COA) executing on the ASP input including a first action on a first item type, and a second action on a second item type to recommend in response to the first action on the first item type;

locating a record in a permanent data store accessible to the ASP that contains the first action, the first item type, the second action, and the second item type; and assigning a value to a token associated with the record based on when the ASP previously generated a recommendation including the first action on the first item type and the second action on the second item type to recommend in response to the first action on the first item type;

generating a new recommendation including the first action on the first item type and the second action on the second item type to recommend in response to the first action on the first item type, based on the value assigned to the token associated with the record; and transmitting the new recommendation to the COA.

16. The non-transitory computer readable storage media of claim 15, wherein the value assigned to the token comprises a count associated with the record, and wherein the instructions cause the ASP to perform the generating of the new recommendation that includes the first action on the first item type and the second action on the second item type to recommend in response to the first action on the first item type, based on the value assigned to the token associated with the record, comprises instructions that cause the ASP to perform the operation of generating the new recommendation that includes the first action on the first item type and the second action on the second item type when the count associated with the record is greater than zero or exceeds a threshold value.

17. The non-transitory computer readable storage media of claim 15, further comprising instructions that cause the ASP to perform the following operations:

reassigning the value of the token associated with the record responsive to generating the new recommendation that includes the first action on the first item type and the second action on the second item type; and assigning a value to a second token associated with the record that indicates when the generation occurred for the new recommendation that includes the first action on the first item type and the second action on the second item type.

18. The non-transitory computer readable storage media of claim 15, further comprising instructions that cause the ASP to perform the following operations:

adding a new record that contains the first action, the first item type, the second action, and the second item type to the permanent data store when failing to locate the record that contains the first action, the first action type, the second action, and the second item type in the permanent data store;

assigning a value to a token associated with the new record indicating to the ASP to include the first action on the first item type and the second action on the second item type to recommend in response to the first action on the first item type; and assigning a value to a second token associated with the new record indicating the ASP has yet to generate a new recommendation that includes the first action on the first item type and the second action on the second item type to recommend in response to the first action on the first action type.

19. The non-transitory computer readable storage media of claim 15, wherein a customer organization associated with the COA is a tenant of a multi-tenant database system accessible to the ASP; and wherein the instructions that cause the ASP to perform the operation of locating the record in the permanent data store accessible to the ASP that contains the first action, the first item type, the second action, and the second item type, comprises instructions for locating a record in a multi-tenant database that additionally contains a COA identifier associated with the customer organization.

20. The non-transitory computer readable storage media of claim 15, wherein the instructions for receiving from the COA executing on the ASP input including the first action on the first item type, comprises instructions for receiving from the COA input from a user client device selecting the first action on the first item type; and wherein the instructions for receiving from the COA executing on the ASP input including the second action on the second item type to recommend in response to the first action on the first item type, comprises instructions for receiving input from the COA recommending to the user client device the second action on the second item type in response to receiving the input from the user client device selecting the first action on the first item type.

21. The non-transitory computer readable storage media of claim 15, wherein the instructions for assigning the value to the token associated with the record based on when the ASP previously generated the recommendation that included the first action on the first item type and the second action on the second item type to recommend in response to the first action on the first item type, comprises instructions for incrementing a count associated with the record based on when the ASP most recently generated the recommendation, wherein the count is based on one of: a number of days, and a square of the number of days, elapsed since the ASP most recently generated the recommendation that included the first action on the first item type and the second action on the second item type.

* * * * *